US 10,498,425 B2
Dec. 3, 2019

(12) United States Patent
Kutz et al.

(54) WIRELESS COMMUNICATION SYSTEM TRANSMIT AND RECEIVE BEAM REFINEMENT BASED ON SPATIAL POWER PROFILE

(71) Applicant: QUALCOMM INCORPORATED, San Diego, CA (US)

(72) Inventors: Gideon Shlomo Kutz, Ramat Hasharon (IL); Amit Bar-Or Tillinger, Petach Tikva (IL); Assaf Touboul, Netanya (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/951,454

(22) Filed: Apr. 12, 2018

(65) Prior Publication Data
US 2018/0302141 A1    Oct. 18, 2018

Related U.S. Application Data

(60) Provisional application No. 62/485,289, filed on Apr. 13, 2017.

(51) Int. Cl.
*H04B 7/06* (2006.01)
*H04B 7/0426* (2017.01)
(Continued)

(52) U.S. Cl.
CPC .......... *H04B 7/0634* (2013.01); *H04B 7/043* (2013.01); *H04B 7/0617* (2013.01);
(Continued)

(58) Field of Classification Search
CPC .... H04B 7/0634; H04B 7/0695; H04B 7/088; H04B 7/0848; H04B 7/043; H04B 7/0617;
(Continued)

(56) References Cited

U.S. PATENT DOCUMENTS 10,038,480 B2 * 7/2018 Kim ...................... H04B 7/043
2006/0025178 A1   2/2006 Tao et al.
(Continued)

FOREIGN PATENT DOCUMENTS

WO    2015182890 A1    12/2015
WO    2016120588 A1    8/2016
WO    2016190653 A1    12/2016

OTHER PUBLICATIONS

International Search Report and Written Opinion—PCT/US2018/027413—ISA/EPO—Jul. 24, 2018 (173585WO).

*Primary Examiner* — Vineeta S Panwalkar
(74) *Attorney, Agent, or Firm* — Smith Tempel Blaha LLC

(57) ABSTRACT

A method for refining radio frequency communication link quality in a communication system may include obtaining measured beam pair quality data between one or more transmit beams and one or more receive beams during a measurement time interval. Beam pair quality data may be measured using an antenna array in which each antenna has a weight. A combination of antenna weights defines an antenna array configuration or beam. The method may further include, during a communication time interval following the measurement time interval, adjusting an antenna weight combination in response to the measured beam pair quality data and a previous antenna array configuration, to define a next antenna array configuration. A transmitter and receiver may communicate information using the next antenna array configuration during the communication time interval. Other aspects, embodiments, and features are also claimed and described.

30 Claims, 14 Drawing Sheets

(51) Int. Cl.
*H04L 5/00* (2006.01)
*H04B 7/08* (2006.01)
*H04L 27/26* (2006.01)

(52) U.S. Cl.
CPC ........... *H04B 7/0695* (2013.01); *H04B 7/088* (2013.01); *H04B 7/0848* (2013.01); *H04L 5/006* (2013.01); *H04L 5/001* (2013.01); *H04L 5/0023* (2013.01); *H04L 5/0082* (2013.01); *H04L 27/2601* (2013.01)

(58) Field of Classification Search
CPC ... H04L 5/006; H04L 27/2601; H04L 5/0082; H04L 5/0023; H04L 5/001
See application file for complete search history.

(56) References Cited

U.S. PATENT DOCUMENTS

| | | |
|---|---|---|
| 2010/0164805 A1 | 7/2010 | Niu et al. |
| 2011/0304504 A1 | 12/2011 | Prasad et al. |
| 2015/0289147 A1 | 10/2015 | Lou et al. |
| 2016/0337916 A1 | 11/2016 | Deenoo et al. |
| 2016/0344464 A1* | 11/2016 | Kim .................. H04B 7/0617 |
| 2017/0033854 A1* | 2/2017 | Yoo .................... H04W 24/00 |
| 2017/0078004 A1 | 3/2017 | Capar et al. |
| 2017/0201999 A1 | 7/2017 | Kang et al. |
| 2017/0208494 A1 | 7/2017 | Moon et al. |
| 2017/0353254 A1* | 12/2017 | Islam .................. H01Q 3/2605 |
| 2018/0159600 A1 | 6/2018 | Kim et al. |

* cited by examiner

| PARAMETER | DELAY (ms) | POWER (dB) | AoD (degrees) | AoA (degrees) | ZoD (degrees) | ZoA (degrees) |
|---|---|---|---|---|---|---|
| CLUSTER 402 | 0 | 0 | 9.3 | -173.7 | 105.5 | 78.9 |
| CLUSTER 404 | 0.29 | -1.2 | -11.4 | 155.1 | 103.2 | 67.5 |
| CLUSTER 406 | 1.78 | -1.9 | 30.6 | -139.1 | 103 | 78 |

WIRELESS COMMUNICATION SYSTEM TRANSMIT AND RECEIVE BEAM REFINEMENT BASED ON SPATIAL POWER PROFILE

RELATED APPLICATIONS

The benefit of U.S. Provisional Patent Application No. 62/485,289, filed Apr. 13, 2017, entitled "WIRELESS COMMUNICATION SYSTEM TRANSMIT AND RECEIVE BEAM REFINEMENT BASED ON SPATIAL POWER PROFILE," is hereby claimed, and the contents thereof are hereby incorporated herein by this reference for all applicable purposes and in its entirety as if fully set for the below.

TECHNICAL FIELD

The technology discussed below relates generally to wireless communication systems, and more particularly to beam-forming wireless communication systems.

INTRODUCTION

Wireless communication systems are widely deployed to provide various types of communications content such as voice, video, packet data, messaging, broadcast, and so on. These systems may be multiple access systems capable of supporting communication with multiple users by sharing the available system resources (e.g., time, frequency, and power). Examples of such multiple access systems include code-division multiple access (CDMA) systems, time-division multiple access (TDMA) systems, frequency-division multiple access (PDMA) systems, and orthogonal frequency-division multiple access (OFDMA) systems.

By way of example, a wireless multiple access communication system may include a number of base stations, each simultaneously supporting communication for multiple communication devices, each otherwise known as user equipment (UE). A base station may communicate with one or more UEs on downlink (DL) channels (e.g., for transmissions from a base station to a UE) and uplink (UL) channels (e.g., for transmissions from a UE to a base station).

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the DL, SC-FDMA on the UL, and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies. An example of an improvement to LTE technology is referred to as 5G. The term 5G represents an evolution of LTE technology including, for example, various improvements to the wireless interface, processing improvements, and the enablement of higher bandwidth to provide additional features and connectivity. A feature of 5G is the use of millimeter wave (mmW) frequency bands and beam forming. Beam forming concentrates the radio energy in a narrow, selective (i.e., non-omnidirectional) pattern to increase gain without having to increase transmission power.

A challenge in designing a beam-forming communication system is to enable the transmitter and receiver to find the "best" beam path. That is, to optimize communication link quality between the transmitter and receiver, the transmitter must form an outgoing beam and the receiver must form an incoming beam that best match the channel propagation conditions. A straightforward solution may be for the transmitter and receiver each to essentially continuously sweep or scan its beam through a range of spatial orientations and have the receiver (e.g., UE) measure the strength or power of signals it receives, until the "instantaneous" (for the next transmission of information) best beam path is found. Given that the transmitter and receiver beam each can be oriented in any of N possible directions, exhaustively testing $N^2$ combinations of beam orientations would be time consuming. The difficulty of solving the challenges of link quality optimization is increased if it is taken into account that one or both of the transmitter and receiver may be in motion, causing channel conditions (e.g., multipath propagation) to change.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for refining radio frequency (RF) communication link quality in a communication system. Such an exemplary method may include obtaining measured beam pair quality data between one or more transmit (Tx) beams and one or more receive (Rx) beams during a measurement time interval using an antenna array having a plurality of antennas. Each antenna is configurable with a weight. A combination of weights of corresponding antennas defines an antenna array configuration or beam. The method may further include adjusting the combination of weights to define a next antenna array configuration in response to the measured beam pair quality data and a previous antenna array configuration during a communication time interval following the measurement time interval.

Another aspect of the disclosure provides an apparatus for refining RF communication link quality. Such an exemplary apparatus may include an antenna array, RF transceiver circuitry, and a processing system comprising a processor and memory. The antenna array has a plurality of antennas, each configurable with a weight. A combination of weights of corresponding antennas defines an antenna array configuration or beam. The processing system may be configured to obtain measured beam pair quality data between one or more Tx beams and one or more Rx beams using the antenna array during a measurement time interval. The processing system may further be configured to adjust the combination of weights to define a next antenna array configuration in response to the measured beam pair quality data and a previous antenna array configuration during a communication time interval following the measurement time interval.

Yet another aspect of the disclosure provides a non-transitory computer-readable medium storing computer executable code for controlling a method for refining RF communication link quality. The code is executable by a processor to control a method that may include obtaining measured beam pair quality data between one or more Tx beams and one or more Rx beams during a measurement time interval using an antenna array having a plurality of antennas. Each antenna is configurable with a weight. A combination of weights of corresponding antennas defines an antenna array configuration. The method may further include adjusting the combination of weights to define a next antenna array configuration in response to the measured beam pair quality data and a previous antenna array configuration during a communication time interval following the measurement time interval.

Still another aspect of the disclosure provides a device for refining RF communication link quality. Such an exemplary device may include means for obtaining measured beam pair quality data between one or more Tx beams and one or more Rx beams during a measurement time interval using an antenna array having a plurality of antennas. Each antenna is configurable with a weight. A combination of weights of corresponding antennas defines an antenna array configuration. The device may further include means for adjusting the combination of weights to define a next antenna array configuration in response to the measured beam pair quality data and a previous antenna array configuration during a communication time interval following the measurement time interval.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 5 is a table representing an example of a multi-cluster channel model, in accordance with various aspects of the present disclosure.

DETAILED DESCRIPTION

Figure 1:
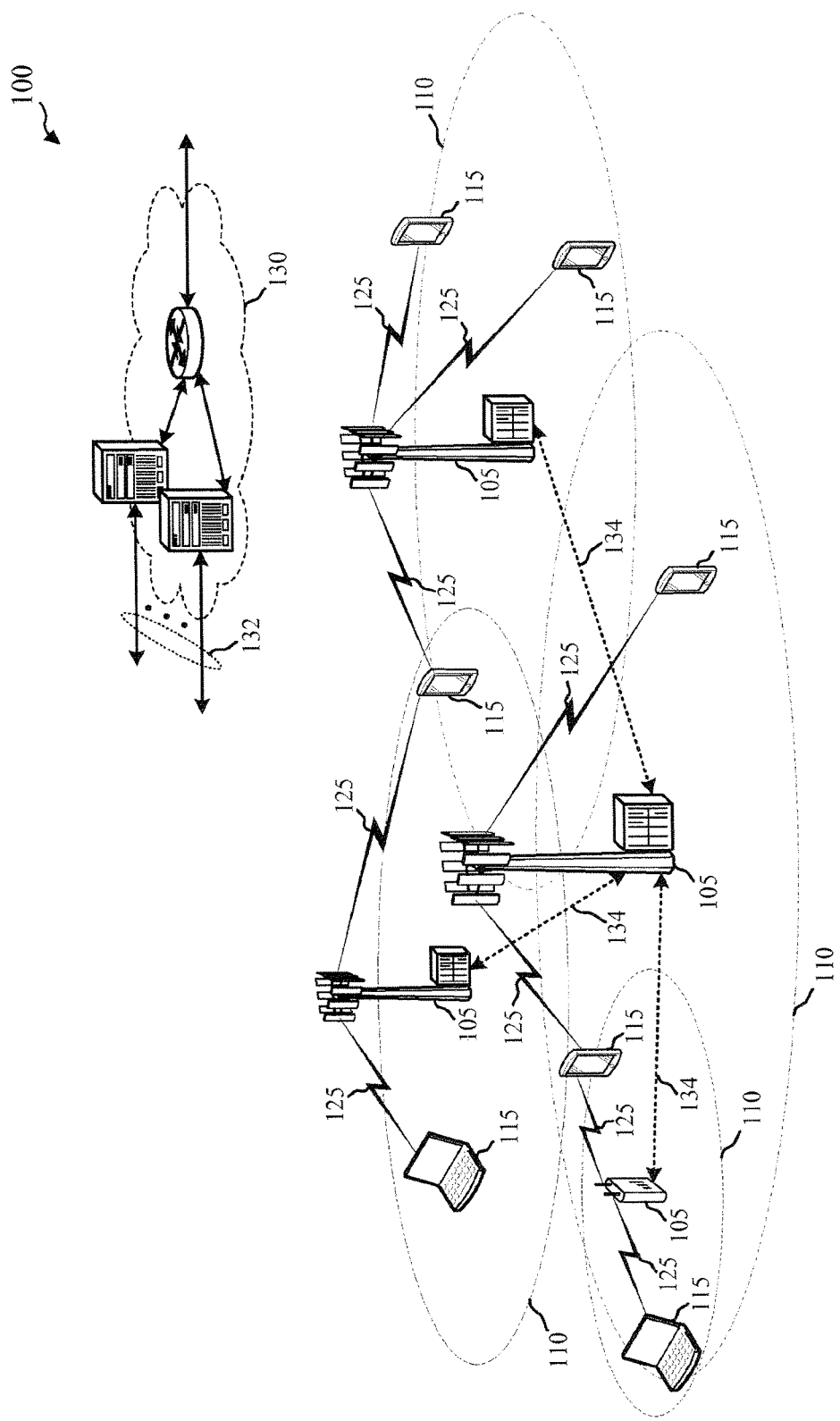
FIG. 1 is a network diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Non-transitory computer-readable media include computer-readable storage media. Computer-readable storage media may be any available media that can be accessed by a computer. By way of example, and not limitation, such computer-readable storage media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. Core network 130 may provide user authentication, access authorization, tracking, Internet Protocol (IP) connectivity, and other access, routing, or mobility functions. Base stations 105 interface with core network 130 through a first set of backhaul links 132 (e.g., S1, etc.) and may perform radio configuration and scheduling for communication with UEs 115, or may operate under the control of a base station controller (not shown). In various examples, base stations 105 may communicate, either directly or indirectly (e.g., through core network 130), with each other over a second set of backhaul links 134 (e.g., X1, etc.), which may be wired or wireless communication links.

Each base station site may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for any one of base stations 105 may be divided into sectors making up only a portion of the coverage area (not shown). Wireless communications system 100 may include base stations 105 of different types (e.g., macro and/or small cell base stations). There may be overlapping geographic coverage areas 110 for different technologies.

In some examples, wireless communications system 100 may be one or more of an LTE/LTE-A network and a 5G network. In LTE/LTE-A networks, the term evolved Node B (eNB), or in a 5G network, the term millimeter wave B (mWB) or gigabit Node B (gNB), may be used generally to describe base stations 105, while the term UE may be used generally to describe UEs 115. Wireless communications system 100 may be a heterogeneous LTE/LTE-A and 5G network in which different types of eNBs and/or mWBs provide coverage for various geographical regions. For example, each eNB, mWB, or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, wireless communications system 100 may be, or may include a millimeter wave communication network.

The term "NR" may be used herein to refer to "new radio," which is a way of referring to a radio interface that may be part of the 5G communication methodology. The term "NR" may be used interchangeably with the term "5G."

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

Wireless communications system 100 may support synchronous or asynchronous operation. For synchronous operation, base stations 105 may have similar frame timing, and transmissions from different base stations may be approximately aligned in time. For asynchronous operation, base stations 105 may have different frame timing, and transmissions from different base stations may not be aligned in time.

As described in further detail below, communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, mWBs, relay base stations, and the like. A UE 115 may also be able to communicate with other UEs either within or outside the same coverage area of a base station via device-to-device (D2D) communications.

The communication links 125 shown in wireless communications system 100 may carry or represent uplink (UL) transmissions from a UE 115 to a base station 105, and/or downlink (DL) transmissions from a base station 105 to a UE 115. The DL transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplexing (FDD), e.g., using paired spectrum resources, or time division duplexing (TDD) operation, e.g., using unpaired spectrum resources. Frame structures for FDD (e.g., frame structure type 1) and TDD (e.g., frame structure type 2) may be defined.

Base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

The modulation and multiple access scheme employed by UEs 115 and base stations 105 may vary depending on the particular telecommunications standard being deployed. In LTE applications, orthogonal frequency division multiplexing (OFDM) is used on the DL and single-carrier frequency division multiple access (SC-FDMA) is used on the UL to support both FDD and TDD. As those skilled in the art will readily appreciate from the detailed description to follow, the various concepts presented herein are well suited for LTE and 5G applications. However, these concepts may readily be extended to other telecommunication standards employing other modulation and multiple access techniques. By way of example, these concepts may be extended to Evolution-Data Optimized (EV-DO), Ultra Mobile Broadband (UMB), or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 2:
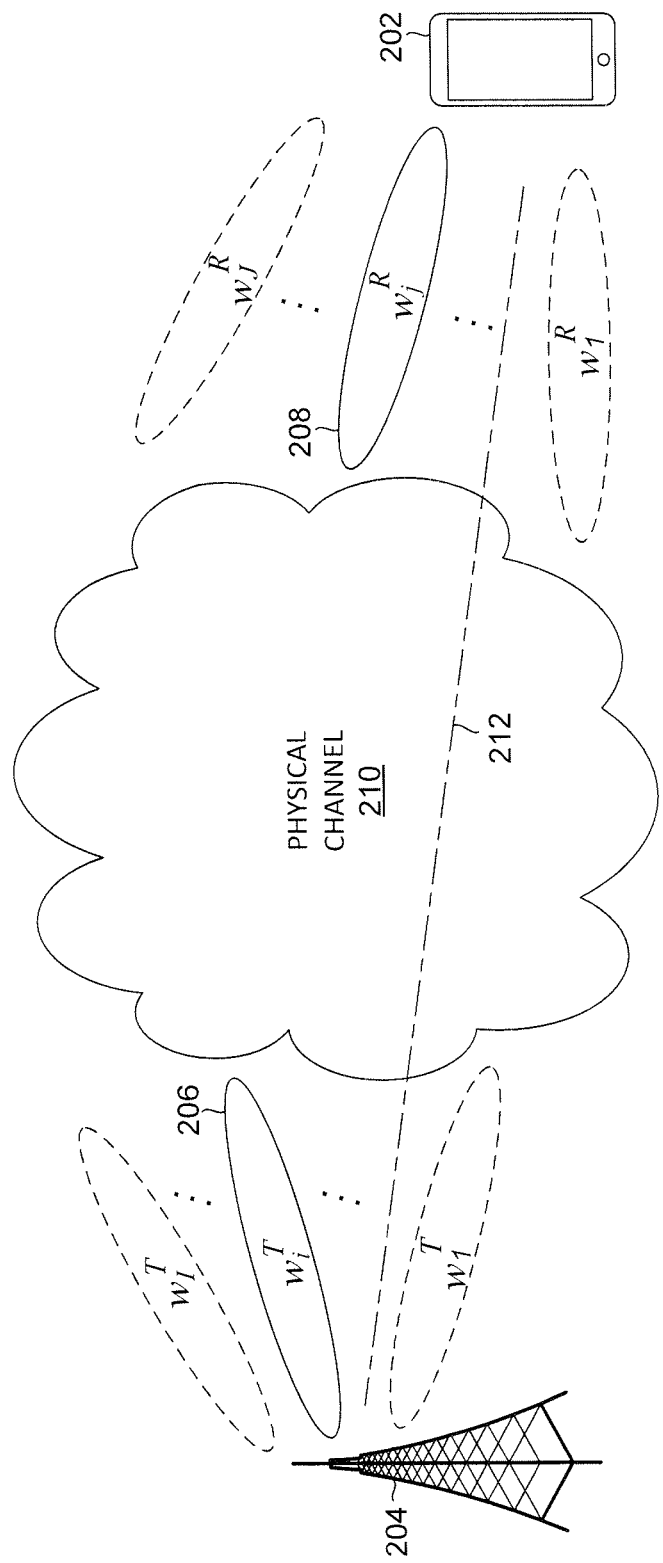
FIG. 2 illustrates a base station and a user equipment (UE) communicating via beam-formed communication signals, in accordance with various aspects of the present disclosure.

FIG. 2 illustrates a UE 202 in RF communication with a base station 204. UE 202 may be an example of one of UEs 115 (FIG. 1). Base station 204 maybe an example of one of base stations 105 (FIG. 1). UE 202 and base station 204 employ beam forming, a technique by which transmissions can be steered or directed in a selected (i.e., non-omnidirectional) direction. For example, base station 204 may generate a transmit (Tx) beam that base station 204 may selectively direct or orient in any of a number of directions. For purposes of consistency with examples described below, FIG. 2 conceptually illustrates base station 204 configured to transmit any selected Tx beam from a set of "I" Tx beams, where I is an integer number of Tx beams, an exemplary one of which may be referred to as an "$i^{th}$" Tx beam 206, where "i" is an index between 1 and I inclusive. Similarly, FIG. 2 conceptually illustrates UE 202 configured to receive any selected receive (Rx) beam from a set of "J" Rx beams, where J is an integer number of Rx beams, an exemplary one of which may be referred to as a "$j^{th}$" Rx beam 208, where "j" is an index between 1 and J inclusive. Note that due to multipath propagation through a physical channel 210, Tx beam 206 and Rx beam 208 are not necessarily aligned with each other along a line of sight 212 between UE 202 and base station 204, even though Tx beam 206 and Rx beam 208 together form an example of one of communication links 125 (FIG. 1). Note that in FIG. 2 and the examples that follow, only the DL operation is described for purposes of clarity. That is, the examples described in this disclosure relate primarily to transmission of signals from a base station to a UE. Nevertheless, it should be understood that any of the exemplary UEs described in this disclosure can also transmit signals to the exemplary base stations described in this disclosure through UL operation.

Figure 3A:
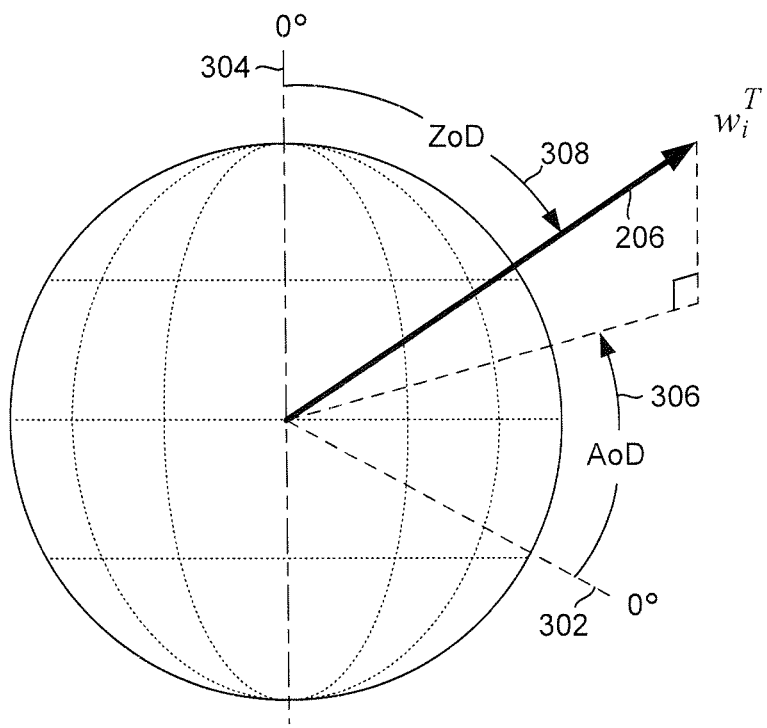
FIG. 3A illustrates an example of a transmit (Tx) beam in relation to a spherical coordinate system, in accordance with various aspects of the present disclosure.

FIG. 3A illustrates an example of a direction in which Tx beam 206 may be oriented with respect to a spherical coordinate system having a reference azimuth axis 302 and a reference elevation or zenith axis 304. Thus, the direction of Tx beam 206 may be described by an azimuth of departure (AoD) 306 and a zenith of departure (ZoD) 308.

Figure 3B:
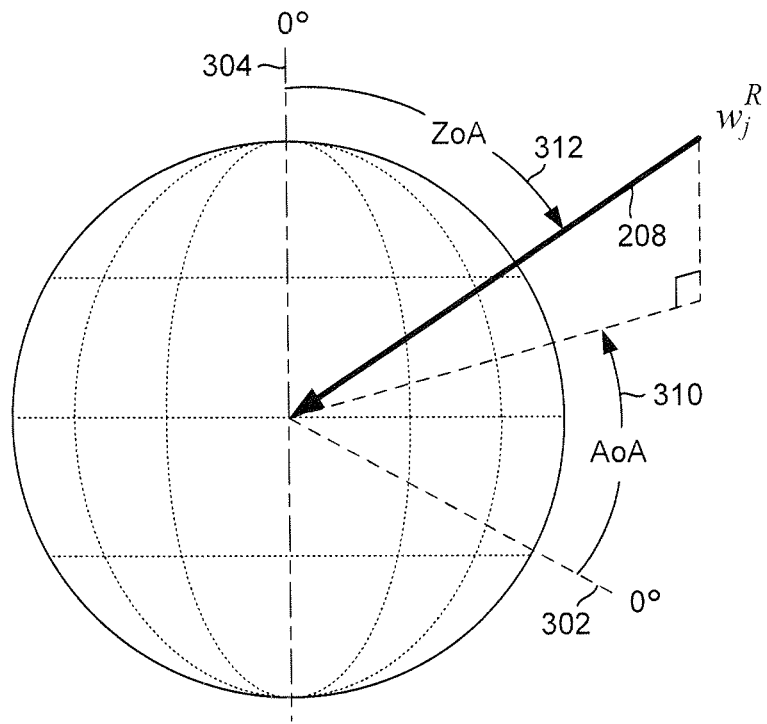
FIG. 3B illustrates an example of a receive (Rx) beam in relation to a spherical coordinate system, in accordance with various aspects of the present disclosure.

FIG. 3B illustrates an example of a direction in which Rx beam 208 may be oriented with respect to the spherical coordinate system. The direction of Rx beam 208 may be described by an azimuth of arrival (AoA) 310 and a zenith of arrival (ZoA) 312.

The above-described spherical coordinate system may similarly be used to describe RF signal propagation characteristics of channel 210 (FIG. 2). The term "cluster" may be used to refer to a channel path.

Figure 4A:
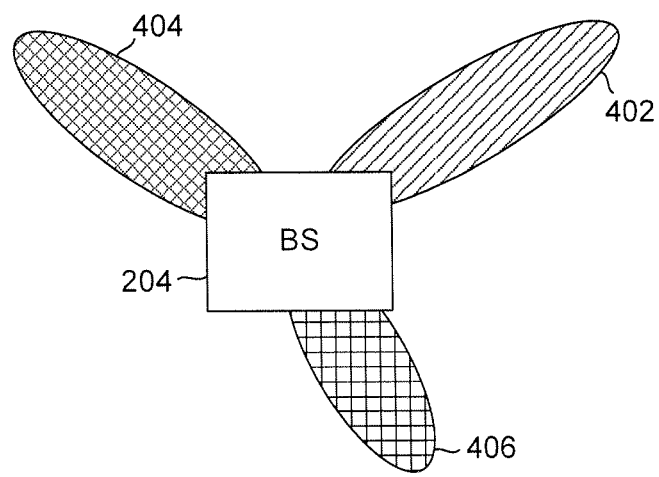
FIG. 4A illustrates an example of clusters representing channel propagation conditions at a base station, in accordance with various aspects of the present disclosure.
Figure 4B:
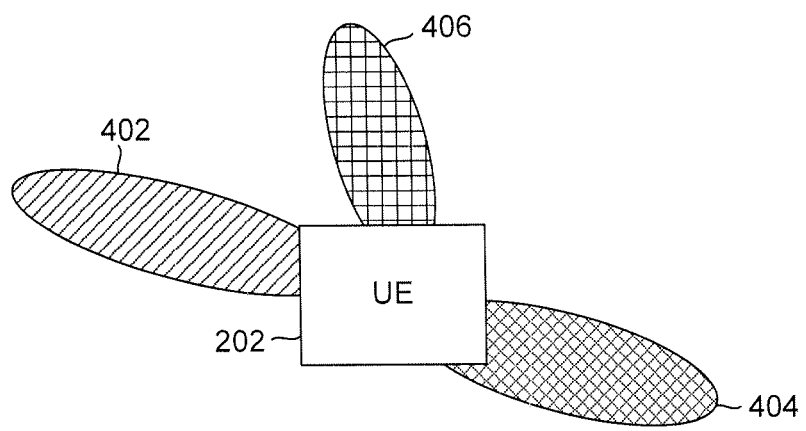
FIG. 4B illustrates an example of clusters representing channel propagation conditions at a UE, in accordance with various aspects of the present disclosure.

FIG. 4A illustrates an example of a set of clusters 402, 404, and 406 with respect to base station 204. FIG. 4B illustrates the same set of clusters 402, 404, and 406 with respect to UE 202. Although clusters 402-406 are three-dimensional, and can be described using the spherical coordinate system, clusters 402-406 are conceptually depicted in FIGS. 4A-4B as two-dimensional for purposes of clarity.

FIG. 5 illustrates an example of a table 500 that may represent a channel model (e.g., of channel 210). A channel may be modeled as a set of clusters, such as the above-referenced exemplary clusters 402-406. Although there are three clusters 402-406 in the illustrated example, there may be any number of clusters in the set. Columns of table 500 list the following examples of channel parameters: delay, power, AoD, AoA, ZoD, and ZoA. Rows of table 500 list the set of clusters. The delay parameter may represent an amount of time between departure of a transmission from a transmitter, such as base station 204, and arrival of the transmission at a receiver, such as UE 202. The power parameter may represent the power of a received signal measured at a receiver, such as UE 202. The AoD, AoA, ZoD, and ZoA parameters may be defined as described above with regard to FIGS. 3A-3B. The numeric values shown within table 500 are intended to serve only as examples, for purposes of illustration, and may be any values. Although for purposes of clarity FIG. 5 illustrates a multi-cluster channel model in the form of table 500, it should be understood that the processing logic embodying the methods described in this disclosure (e.g., a processing system as configured by software) may represent such a multi-cluster channel model in any manner.

A cluster represents a signal propagation path. Some clusters of a channel model may be more conducive to signal propagation than other clusters of the channel model, as measured by one or more parameters, such as delay, power, or a combination thereof. One of the clusters may be the "best" or highest-quality cluster, i.e., more conducive to signal propagation than the other clusters. Accordingly, in the example described above, a straightforward method for promoting signal propagation through channel 210 would be for base station 204 (FIG. 2) to select a combination of a Tx beam 206 and a Rx beam 208 that are each spatially aligned with the "best" one of clusters 402-406 (FIG. 4). To find the best cluster, base station 204 could sweep Tx beam 206 through a large number (N) of directions, and while Tx beam 206 is oriented in each direction, UE 202 could similarly sweep Rx beam 208 through N directions and measure received signal quality, until a signal quality measurement for each of the N×N combinations of Tx and Rx beam directions has been obtained. The highest signal quality measurement could then be correlated with the best cluster, and UE 202 and base station 204 could then align the Rx and Tx beams with that cluster during further communication with each other. However, such a method would need to be repeated frequently because signal fading due to motion of UE 202 or environmental factors may cause the clusters to change location and quality. A cluster that the method determined to be the best cluster may not remain the best cluster long enough to accommodate further communication. The methods described below for Tx and Rx beam refinement may provide advantages over this straightforward method. Different shading is used in FIGS. 4A-4B to depict each of clusters 402, 404, and 406 to emphasize that, but for the beam refinement methods described in this disclosure, a conventional UE or base station would perceive each of clusters 402, 404, and 406 as distinct from the others (e.g., for purposes of determining the "best" cluster among them).

Figure 6:
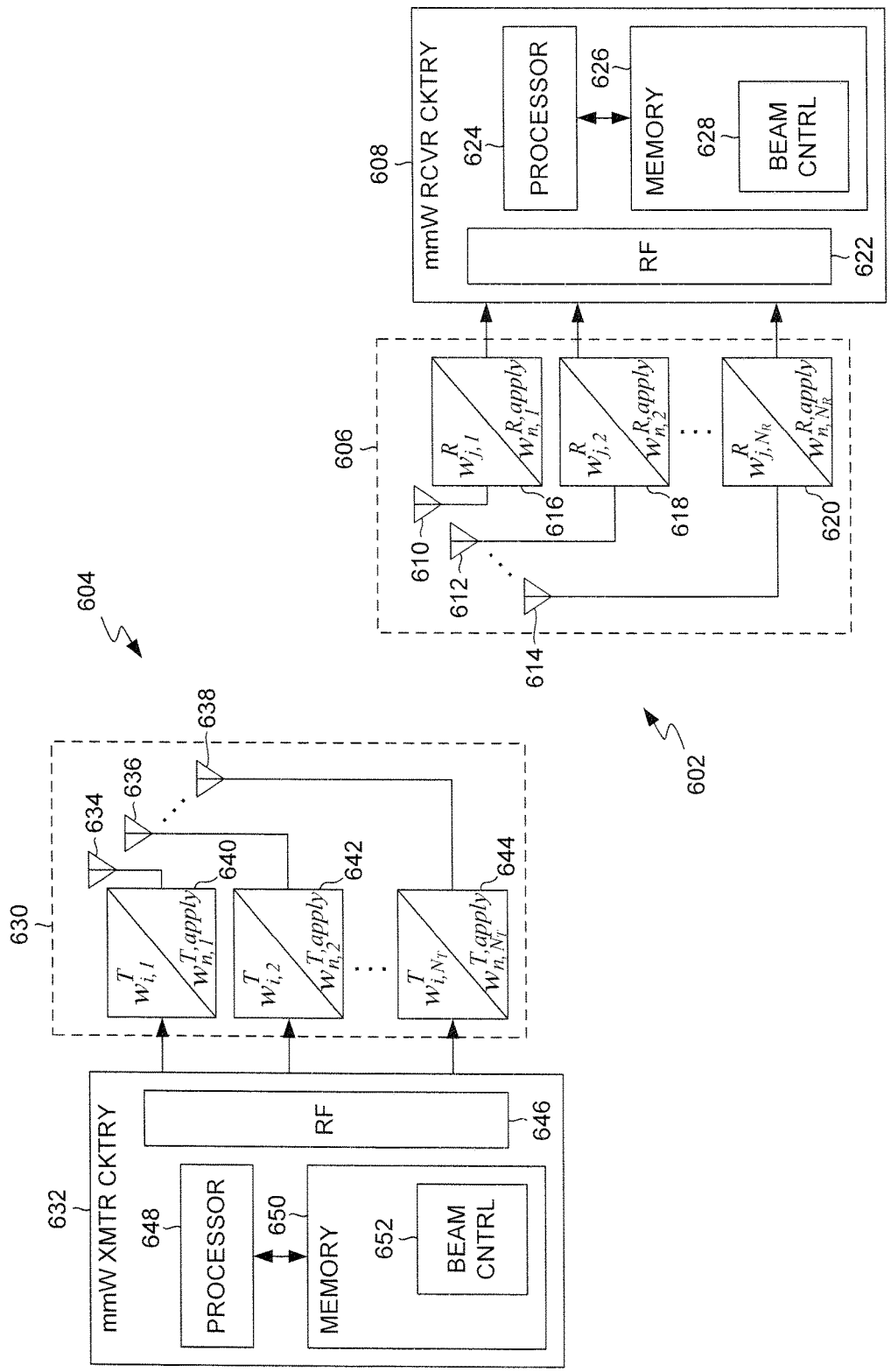
FIG. 6 is a block diagram of an exemplary base station and an exemplary UE, in accordance with various aspects of the present disclosure.

FIG. 6 illustrates a UE 602 and a base station 604 that may communicate with each other in the manner described above. UE 602 may be an example of above-described UE 202 (FIG. 2) or UE 115 (FIG. 1), and base station 604 may be an example of above-described base station 204 (FIG. 2) or base station 105 (FIG. 1).

UE 602 includes an Rx antenna array system 606 and receiver circuitry 608. Antenna array system 606 includes a number ($N_R$) of Rx antennas, including a first Rx antenna 610, a second Rx antenna 612, etc., through an $N_R^{th}$ Rx antenna 614, etc. The number ($N_R$) of Rx antennas may be two or more. Although not shown for purposes of clarity, each of Rx antennas 610, 612, 614, etc., is configured with circuitry that enables the above-described beam forming, such as a network of phase shifters and attenuators. As beam forming is well understood by one of ordinary skill in the art, such beam-forming circuitry and other aspects of beam forming are not described in this disclosure. Receiver circuitry 608 and Rx antenna array system 606 may be configured for mmW operation.

Each of Rx antennas 610, 612, 614, etc., is coupled to a corresponding Rx weighting circuit, including a first Rx weighting circuit 616, a second Rx weighting circuit 618, etc., through a $N_R^{th}$ Rx weighting circuit 620. As described below, each of Rx weighting circuits 616, 618, 620, etc., can be configured with a weight that it applies to the signal coupled to the corresponding Rx antenna. Each combination of weights with which Rx weighting circuits 616, 618, 620, etc., are configured configures Rx antenna array system 606 with a different Rx beam. In the exemplary method described below, either of two types of weights may be applied to Rx antenna array system 606: a weight $w_j^R$ that is applied during a measurement time interval, and a weight $w_n^R$ that is applied during a communication time interval. In the notation used herein, the superscript "R" denotes a weight associated with the Rx beam.

Receiver circuitry 608 includes RF circuitry 622, a processor system 624, and memory system 626. Other circuitry of types commonly included in conventional UEs may also be included in UE 602 but is not shown for purposes of clarity.

A portion of the UE functionality described in this disclosure may be performed under the control of processor system 624 through the execution of logic or instructions in the form of software, firmware, etc. Some or all of the beam refinement methods described in this disclosure may be performed under the control of processor system 624 through the execution of Rx beam control logic 628. In the example shown in FIG. 6, memory system 626 is configured with, among other things, Rx beam control logic 628. In this example, Rx beam control logic 628 may be in the form of software or firmware. More generally, memory system 626 or other memory (not shown) may be configured with software or firmware, which, when executed by processor system 624 or other processors (not shown), causes UE 602 to control various methods, including the methods described in this disclosure. Among other functions, processor system 624 may configure Rx antenna array system 606 with the above-described weight $w_j^R$ or $w_n^R$. Although for purposes of clarity Rx beam control logic 628 is shown in FIG. 6 in a conceptual manner as stored in or residing in memory system 626 in the manner of software or firmware, it should be understood that Rx beam control logic 628 may be made accessible to processor system 624 in any manner. Also, it should be noted that memory system 626 is an example of a computer program product comprising a non-transitory computer-readable medium having stored therein in non-transitory computer-executable form, instructions (e.g., Rx beam control logic 628) which, when executed by processor system 624, may effect the methods of operation described in this disclosure. Some or all of receiver circuitry 608 may be implemented using one or more application-specific integrated circuits (ASICs) adapted to control some or all of the associated methods or functions described herein. Alternatively, the methods or functions may be controlled by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art.

Base station 604 includes a Tx antenna array system 630 and transmitter circuitry 632. Antenna array system 630 includes a number ($N_T$) of Tx antennas, including a first Tx antenna 634, a second Tx antenna 636, etc., through an $N_T^{th}$ Tx antenna 638, etc. The number ($N_T$) of Tx antennas may be two or more. Although not shown for purposes of clarity, each of Tx antennas 634, 636, 638, etc., is configured with circuitry that enables the above-described beam forming, such as a network of phase shifters and attenuators.

Each of Tx antennas 634, 636, 638, etc., is coupled to a corresponding Tx weighting circuit, including a first Tx weighting circuit 640, a second Tx weighting circuit 642, etc., through a $N_T^{th}$ Tx weighting circuit 644. As described below, each of Tx weighting circuits 640, 642, 644, etc., can be configured with a weight that it applies to the signal coupled to the corresponding Tx antenna. Each combination of weights with which Tx weighting circuits 640, 642, 644, etc., are configured configures Tx antenna array system 630 with a different Tx beam. In the exemplary method described below, either of two types of weights may be applied to Tx antenna array system 630: a weight $w_i^T$ that is applied during a measurement time interval, and a weight $w_n^T$ that is applied during a communication time interval. In the notation used herein, the superscript "T" denotes a weight associated with the Tx beam.

Transmitter circuitry 632 includes RF circuitry 646, a processor system 648, and memory system 650. Transmitter circuitry 632 and Tx antenna system 630 may be configured for mmW operation. Other circuitry of types commonly included in conventional base stations may also be included in base station 604 but is not shown for purposes of clarity.

A portion of the base station functionality described in this disclosure may be performed under the control of processor system 648 through the execution of logic or instructions in the form of software, firmware, etc. Some or all of the beam refinement methods described in this disclosure may be performed under the control of processor system 648 through the execution of Tx beam control logic 652, which may be similar to above-described Rx beam control logic 628. In the example shown in FIG. 6, memory system 650 is configured with, among other things, Tx beam control logic 652. In this example, Tx beam control logic 652 may be in the form of software or firmware. More generally, memory system 650 or other memory (not shown) may be configured with software or firmware, which, when executed by processor system 648 or other processors (not shown), causes base station 604 to control various methods, including the methods described in this disclosure. Among other functions, processor system 648 may configure Tx antenna array system 630 with the above-described weight $w_i^T$ or $w_n^T$. Although for purposes of clarity Tx beam control logic 652 is shown in FIG. 6 in a conceptual manner as stored in or residing in memory system 650 in the manner of software or firmware, it should be understood that Tx beam control logic 652 may be made accessible to processor system 648 in any manner. Also, it should be noted that memory system 650 is an example of a computer program product comprising a non-transitory computer-readable medium having stored therein in non-transitory computer-executable form, instructions (e.g., Tx beam control logic 652) which, when executed by processor system 648, may effect the methods of operation described in this disclosure. Some or all of transmitter circuitry 632 may be implemented using one or more application-specific integrated circuits (ASICs) adapted to control some or all of the associated methods or functions described herein. Alternatively, the methods or functions may be controlled by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art.

Figure 7:
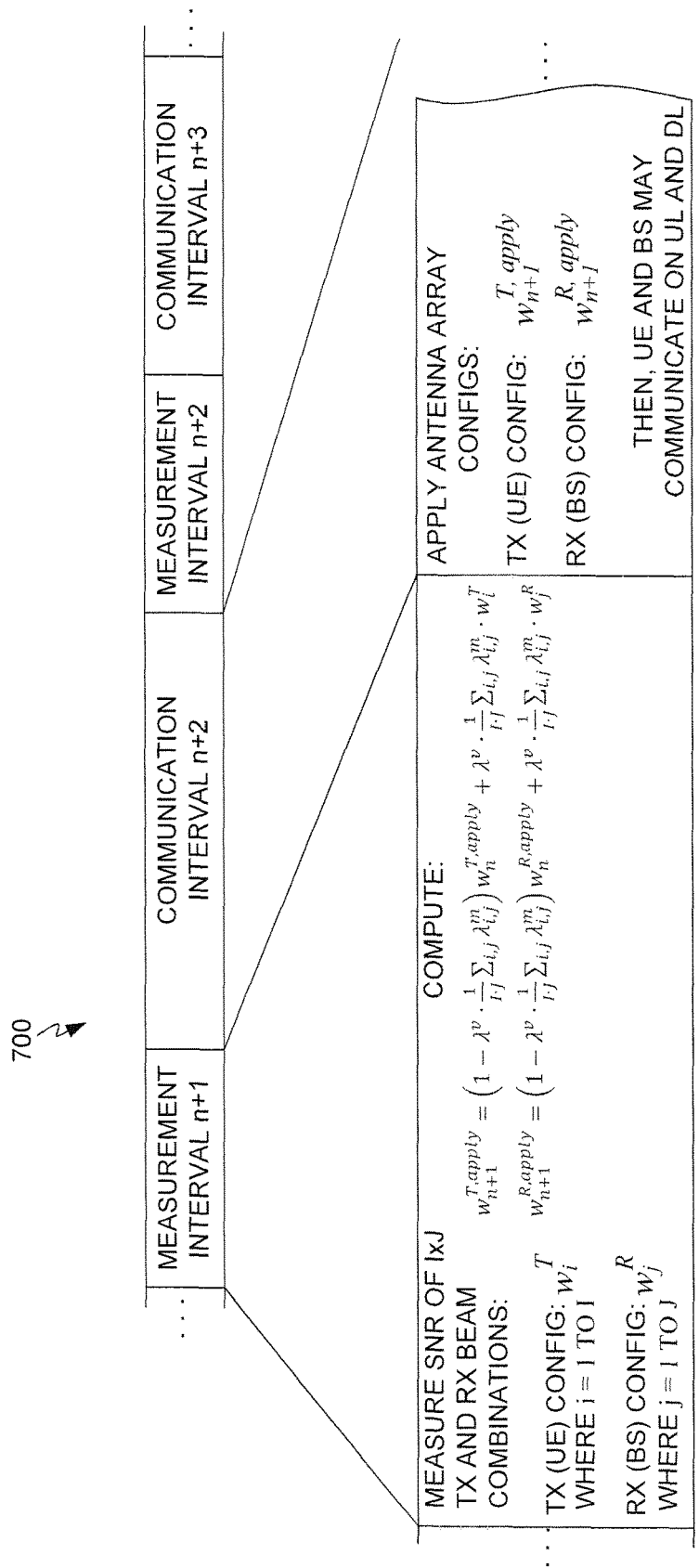
FIG. 7 is a timeline diagram illustrating successive measurement intervals and communication intervals, in accordance with various aspects of the present disclosure.

FIG. 7 conceptually illustrates the timing 700 in accordance with which the exemplary methods may operate. Timing 700 includes successive time intervals, including measurement time intervals and communication time intervals. Each measurement time interval is followed by a communication time interval. In the illustrated example, measurement time intervals alternate with communication time intervals. An example of a measurement time interval is a synchronization sub-frame in a LTE-A, 5G, or similar communications system. Another example of a measurement time interval is the time during which a channel state information reference signal (CSI-RS) is transmitted. An example of a communication time interval is a UL sub-frame or a DL sub-frame, during which time the UE and base station may communicate with each other. Individual time intervals may be referenced using an index n. As shown in FIG. 7, an $(n+1)^{th}$ communication time interval follows an $n^{th}$ measurement time interval, an $(n+1)^{th}$ measurement time interval follows the $(n+1)^{th}$ communication time interval, an $(n+2)^{th}$ communication time interval follows the $(n+1)^{th}$ measurement time interval, an $(n+2)^{th}$ measurement time interval follows the $(n+2)^{th}$ communication time interval, etc.

Figure 8:
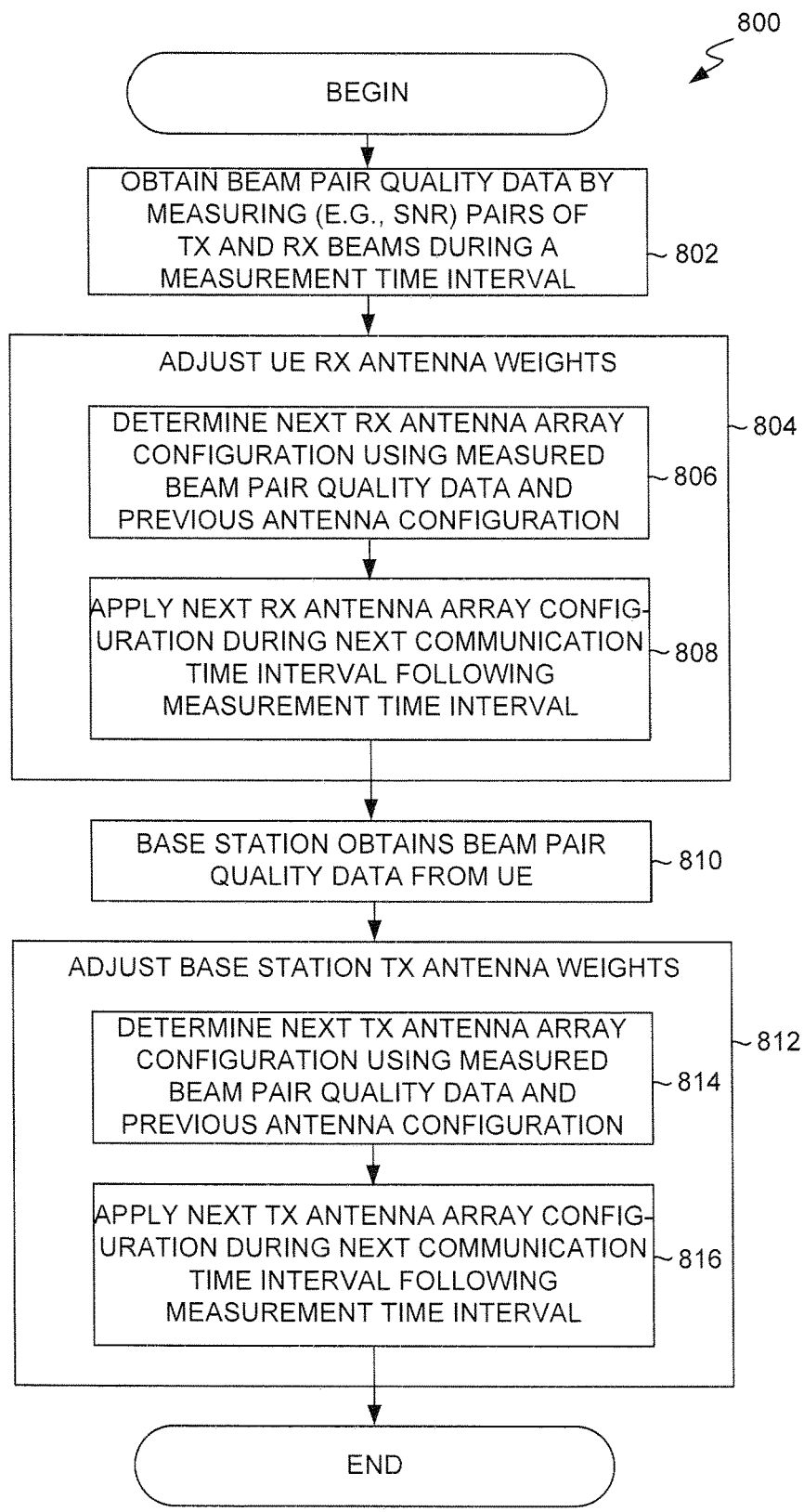
FIG. 8 is a method flow diagram illustrating an exemplary method for refining communication link quality in a communication system, in accordance with various aspects of the present disclosure.

FIG. 8 illustrates an exemplary method 800 for refining RF communication link quality in a communication system as described above. As indicated by block 802, the method may include obtaining measured beam pair quality data between one or more Tx beams and one or more Rx beams during an $n^{th}$ measurement time interval using an antenna array system. This portion of the method may comprise, for example, a UE generating a sequence of different Rx beams, i.e., oriented in different directions, in synchronism with a base station transmitting a sequence of different Tx beams, i.e., oriented in different directions. For example, a base station operating in accordance with OFDM principles may transmit a different Tx beam during each successive OFDM symbol period of a sync sub-frame. The base station may transmit a number (I) of Tx beams in this manner. It may be noted that during a single sync-sub frame, the UE may transmit only a subset of all Tx beams in the base station's basis set, and it may take several successive sync sub-frames for the base station to cycle through all Tx beams in its basis set. That is, the number of Tx beams in the UE's basis set may be greater than I in some examples. For each of the different Tx beams, the UE may attempt to receive a number (J) of corresponding Rx beams. That is, while each one (i.e., an $i^{th}$ one) of the I different Tx beams is being transmitted, the UE attempts to receive J of the different Rx beams by changing the Rx beam direction to define another one (i.e., a $j^{th}$ one) of the different Rx beams, in synchronism with the symbol timing. For purposes of describing exemplary method 800, the $i^{th}$ Tx beam and $j^{th}$ Rx beam, respectively, may be denoted as follows:

$$w_i^T = [w_{j,0}^T, w_{j,1}^T, \ldots w_{N_T-1}^T]$$

$$w_j^R = [w_{j,0}^R, w_{j,1}^R, \ldots w_{N_R-1}^T]$$

While the $i^{th}$ Tx beam is being transmitted at the base station and the $j^{th}$ Rx beam is being received at the UE, the UE may measure a metric of beam quality, such as signal-to-noise ratio (SNR). That is, each beam pair quality measurement $S_{i,j}$ is based on the $i^{th}$ Tx beam and the $j^{th}$ Rx beam. In this manner, the UE obtains a number (I×J) of beam pair (i.e., Tx and Rx) quality measurements (e.g., SNR measurements) $S_{i,j}$ during an $n^{th}$ sync sub-frame or other $n^{th}$ measurement time interval. With reference to timing 700 (FIG. 7), the SNRs of the I×J Tx and Rx beam combinations are measured during measurement time interval n in accordance with the following. During each SNR measurement, the base station antenna array system is configured with a Tx weight $w_i^T$ and the UE antenna array system is configured with a Rx weight $w_j^R$. The weights may correspond to the base station and UE cycling through all the beams in their basis sets.

As indicated by block 804, the UE may adjust the Rx antenna array weights to define a new or next Rx antenna array configuration (and thus define a new or next Rx beam) in response to the measured beam pair quality data and the previous (i.e., current) Rx antenna array configuration. Although for purposes of clarity block 804 includes both determining the next Rx antenna array configuration, as indicated by block 806, and applying the next Rx antenna array configuration, as indicated by block 808, the determination and application each may be performed at any time that is in accordance with the general timing 700 described above.

After the UE has collected the I×J beam pair quality (e.g., SNR) measurements $S_{i,j}$, the UE may use the following weighting equation to determine (block 806) the next Rx antenna array configuration, i.e., weights:

$$w_{n+1}^{R,apply} = \left(1 - \lambda^v \cdot \frac{1}{I \cdot J} \sum_{i,j} \lambda_{i,j}^m\right) w_n^{R,apply} + \lambda^v \cdot \frac{1}{I \cdot J} \sum_{i,j} \lambda_{i,j}^m \cdot w_j^R,$$

where: $w_n^{R,apply}$ represents a weight presently being applied in the UE antenna array system during an $n^{th}$ communication time interval; $w_{n+1}^{R,apply}$ represents a new or next weight to be applied in the UE Rx antenna array system during the next or $(n+1)^{th}$ communication time interval in place of the present weight; $\lambda_{i,j}^m$ is a conversion factor that is the result of a function applied to each beam pair quality measurement $S_{i,j}$; and $\lambda^v$ is a fade factor that is the result of a function applied to a measurement of UE velocity. Including such a fade factor based on UE velocity in the weighting equation weights the beam pair quality measurements more heavily when the UE is in motion (or faster) and less heavily when the UE is stationary (or slower). That is, there is a tradeoff between filtering the results to obtain better quality beams (by filtering noise) and tracking the channel variations. Higher UE velocity will result in higher weight to the current measurement to make the adaptation faster.

As indicated by block 808, the UE may apply the new or next Rx antenna array configuration that was determined in the manner described above. For example, the UE may replace or reconfigure the weights in the above-described Rx antenna array system 606 (FIG. 6). Note that the next Rx antenna array configuration defines the next Rx beam to be used (i.e., in UL transmissions) during the next or $(n+1)^{th}$ communication time interval. As described above with regard to FIG. 6, an Rx antenna array configuration may be described as a vector of weights $w_1^R$ through $w_{N_R}^R$ with which the first through $N_R^{th}$ Rx weighting circuits 616-620, respectively, may be configured.

As indicated by block 810, the UE may transmit the I×J beam pair quality (e.g., SNR) measurements $S_{i,j}$ to the base station. As indicated by block 812, the base station may adjust the Tx antenna array weights to define a new or next Tx antenna array configuration (and thus define a new or next Tx beam) in response to the measured beam pair quality data and the previous (i.e., current) Tx antenna array configuration. Although for purposes of clarity block 812 includes both determining the next Tx antenna array configuration, as indicated by block 814, and applying the next Tx antenna array configuration, as indicated by block 816, the determination and application each may be performed at any time that is in accordance with the general timing 700 described above.

After the base station has received the beam pair quality measurements $S_{i,j}$ from the UE, the base station may use the following weighting equation to determine (block 814) the next Tx antenna array configuration, i.e., weights:

$$w_{n+1}^{T,apply} = \left(1 - \lambda^v \cdot \frac{1}{I \cdot J} \sum_{i,j} \lambda_{i,j}^m\right) w_n^{T,apply} + \lambda^v \cdot \frac{1}{I \cdot J} \sum_{i,j} \lambda_{i,j}^m \cdot w_i^T,$$

where: $w_n^{T,apply}$ represents a weight presently being applied in the base station antenna array system during an $n^{th}$ communication time interval; $w_{n+1}^{T,apply}$ represents a new or next weight to be applied in the base station Tx antenna array system during the next or $(n+1)^{th}$ communication time interval in place of the present weight; and $\lambda_{i,j}^m$ and $\lambda^v$ are the same factors described above with regard to determining the Rx weighting.

As indicated by block 816, the base station may apply the new or next Tx antenna array configuration that was determined in the manner described above. For example, the base station may replace or reconfigure the weights in the above-described Tx antenna array system 630 (FIG. 6). Note that the next Tx antenna array configuration defines the next Tx beam to be used (i.e., in DL transmissions) during the next or $(n+1)^{th}$ communication time interval. As described above with regard to FIG. 6, a Tx antenna array configuration may be described as a vector of weights $w_1^T$ through $w_{N_T}^T$ with which the first through $N_T^{th}$ Tx weighting circuits 640-644, respectively, may be configured.

The above-described exemplary method 800 may be performed repeatedly, in accordance with timing 700. Repeating method 800 may result in the applied Tx and Rx beams converging to the sum of the best clusters. For example, with reference again to FIGS. 4A-4B, although from the perspective of the multi-cluster channel model (e.g., FIG. 5) clusters 402, 404, and 406 are distinct from each other, from the perspective of UE 202 and base station 204 there is only a single, multi-lobed "combined cluster" as a result of the exemplary method 800. During each successive communication time interval in which the UE and base station communicate with each other, the quality of such communications may improve as a result of the Tx and Rx beams converging to the combined cluster. In accordance with timing 700, over time, the weighting adapts to changing channel conditions by increasingly weighting the beams toward clusters (from the perspective of the multi-cluster channel model) that become better (i.e., more conducive to signal propagation), and decreasingly weighting the beams toward clusters that become poorer (i.e., less conducive to signal propagation).

Figure 9A:
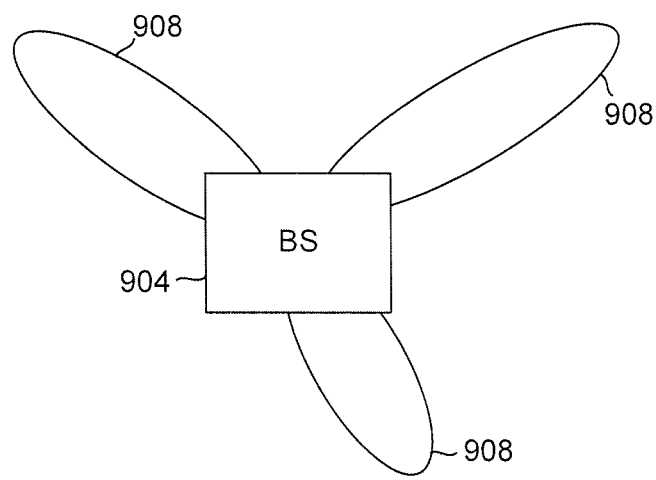
FIG. 9A is similar to FIG. 4A, and illustrates an effect of an exemplary method for refining communication link quality, in accordance with various aspects of the present disclosure.
Figure 9B:
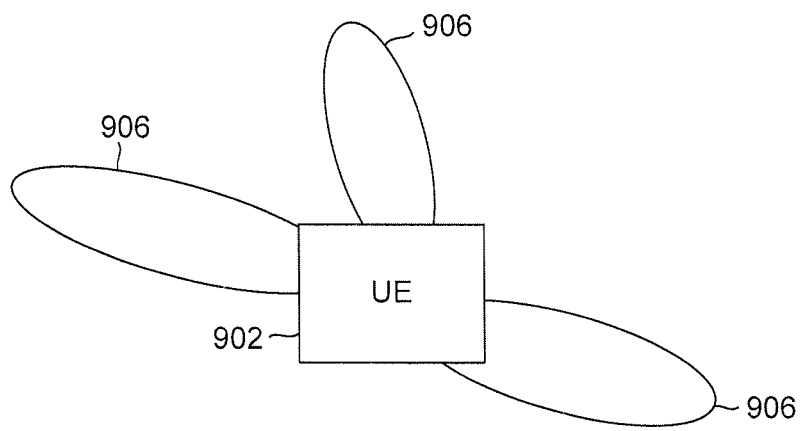
FIG. 9B is similar to FIG. 4B, and illustrates an effect of an exemplary method for refining communication link quality, in accordance with various aspects of the present disclosure.

FIGS. 9A-9B are similar to FIGS. 4A-4B but illustrate the foregoing principle that there is only a single combined cluster 906 (FIG. 9B) from the perspective of a UE 902 (and its Rx beam), and only a single combined cluster 908 (FIG. 9A) from the perspective of a base station 904 (and its Tx beam) participating in the above-described exemplary method 800. Although not depicted by FIGS. 9A-9B, it should be understood that the shape of combined clusters 906 and 908 may change as channel conditions change, such as may occur due to changes in the environment or mobility of the UE.

Figure 10:
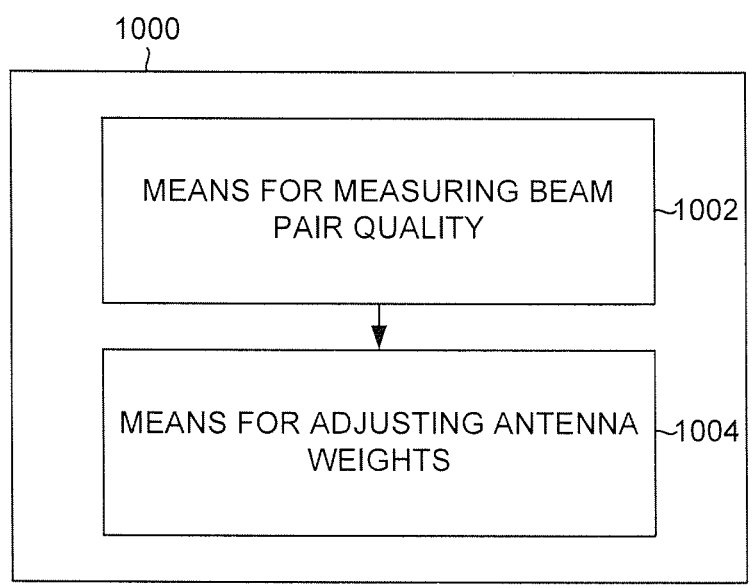
FIG. 10 is a functional block diagram illustrating a device for refining communication link quality in a communication system, in accordance with various aspects of the present disclosure.

FIG. 10 is a functional block diagram illustrating a device 1000 for refining RF communication link quality. As indicated by block 1002, the device may include means for obtaining measured beam pair quality data between one or more transmit beams and one or more receive beams during a measurement time interval. The means for obtaining measured beam pair quality data may, for example, correspond to UE 602 or its (as-configured) processor system 624, alone or in combination with other elements. For example, the RF circuitry 622 of UE 602 may include circuitry configured to measure signals and provide a measurement to processor system 624. In addition, or alternatively, the means for obtaining measured beam pair quality data may, for example, correspond to base station 604 or its (as-configured) processor system 648, alone or in combination with other elements. For example, base station 604 may obtain SNR measurement data from UE 602. As indicated by block 1004, the device may include means for adjusting the combination of weights to define a next antenna array configuration in response to the measured beam pair quality data and a previous antenna array configuration. The means for adjusting the combination of weights may, for example, correspond to UE 602 or its (as-configured) processor system 624, alone or in combination with other elements, such as Rx weighting circuits 616-620. In addition, or alternatively, the means for adjusting the combination of weights may, for example, correspond to base station 604 or its (as-configured) processor system 648, alone or in combination with other elements, such as Tx weighting circuits 640-644.

Figure 11:
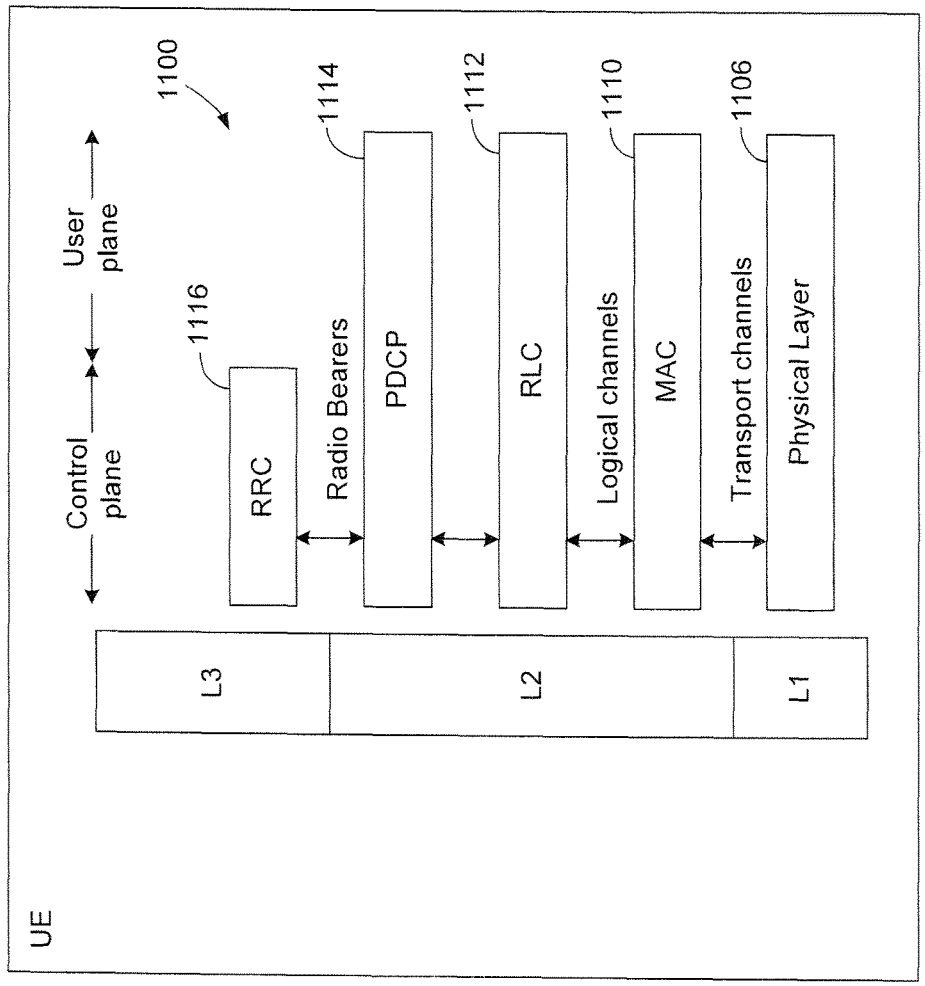
FIG. 11 is a diagram illustrating an example of a radio protocol architecture for the user and control planes in a user equipment, in accordance with various aspects of the present disclosure.

FIG. 11 illustrates an example of a radio protocol architecture 1100 in a UE for the user and control planes in LTE in accordance with various aspects of the present disclosure. Radio protocol architecture 1100 may include three layers: an L1 layer (also referred to as "Layer 1"), an L2 layer (also referred to as "Layer 2"), and an L3 layer (also referred to as "Layer 3"). The L1 layer is the lowest layer and implements various physical layer signal processing functions. The L1 layer may also be referred to as the physical layer 1106. The L2 layer is above the physical layer 1106 and is responsible for the link between the UE and a base station (e.g., eNB), or between the UE and another UE, over the physical layer 1106.

In the user plane, the L2 layer includes a media access control (MAC) sublayer 1110, a radio link control (RLC) sublayer 1112, and a packet data convergence protocol (PDCP) 1114 sublayer. The L3 layer above the L2 layer may include, for example, a network layer (e.g., IP layer) and an application layer.

The PDCP sublayer 1114 provides multiplexing between different radio bearers and logical channels. The PDCP sublayer 1114 also provides header compression for upper layer data packets to reduce radio transmission overhead, security by ciphering the data packets, and handover support for UEs between eNBs. The RLC sublayer 1112 provides segmentation and reassembly of upper layer data packets, retransmission of lost data packets, and reordering of data packets to compensate for out-of-order reception due to hybrid automatic repeat request (HARQ). The MAC sublayer 1110 provides multiplexing between logical and transport channels. The MAC sublayer 1110 may also be involved in allocating radio resources in one cell among multiple UEs. The MAC sublayer 1110 is also responsible for HARQ operations.

In the control plane, the radio protocol architecture for the UE and eNB is substantially the same for the physical layer 1106 and the L2 layer with the exception that there is no header compression function for the control plane. The control plane also includes a radio resource control (RRC) sublayer 1116 in the L3 layer. The RRC sublayer 1116 is responsible for obtaining radio resources (e.g., radio bearers) and for configuring the lower layers using RRC signaling between the eNB and the UE.

Figure 12:
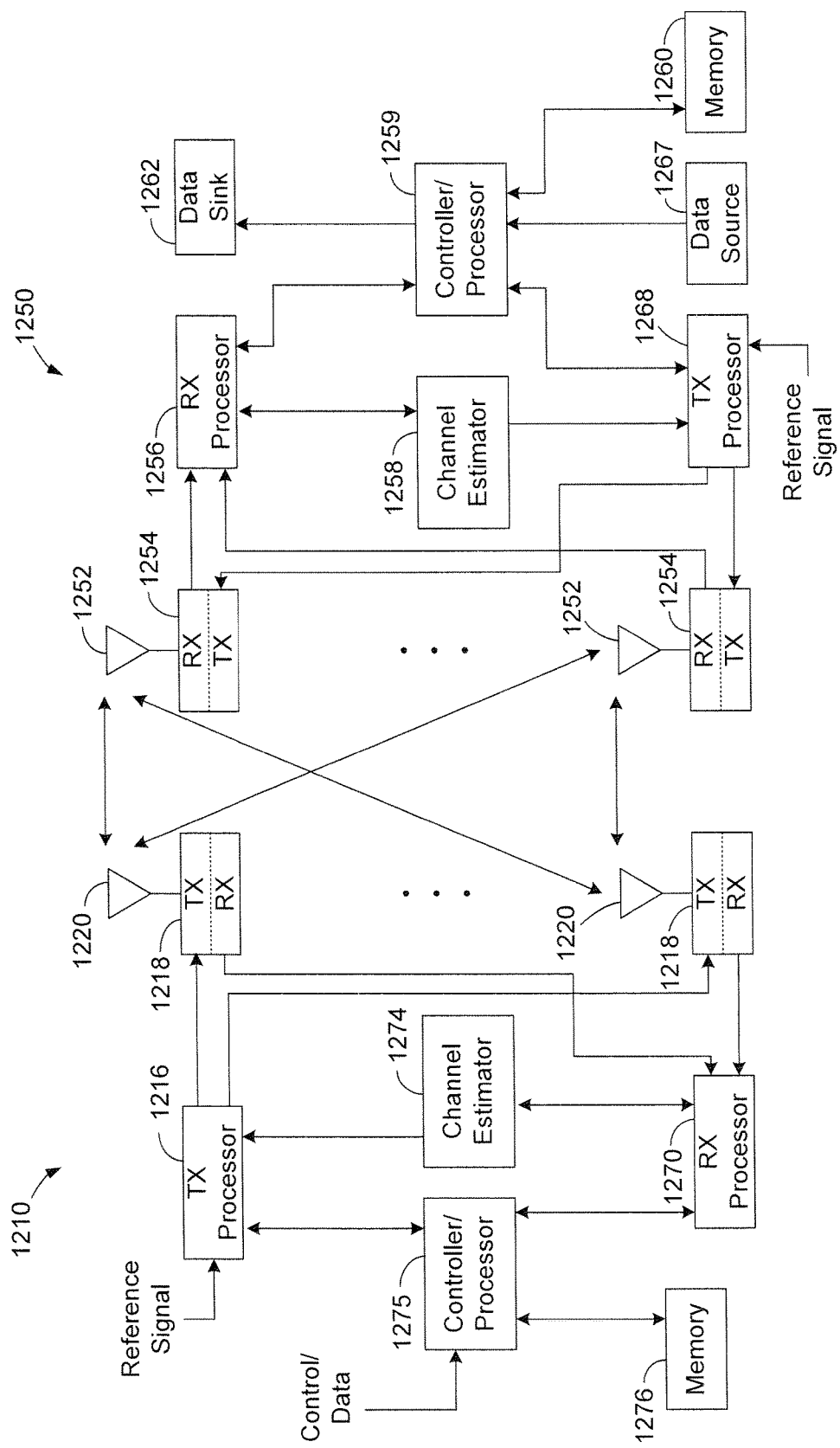
FIG. 12 is a block diagram illustrating an example of an evolved Node B and UE in an access network, in accordance with various aspects of the present disclosure.

FIG. 12 is a block diagram of an eNB 1210 in communication with a UE 1250 in an access network in accordance with various aspects of the present disclosure. The UE 1250 may be an example of any of the above-described UEs 115 (FIG. 1), 202 (FIG. 2), or 602 (FIG. 6). The eNB 1210 may be an example of any of the above-described base stations 105 (FIG. 1), 204 (FIG. 2), or 604 (FIG. 6). In the DL, upper layer packets from the core network are provided to a controller/processor 1275. The controller/processor 1275 implements the functionality of the L2 layer. In the DL, the controller/processor 1275 provides header compression, ciphering, packet segmentation and reordering, multiplexing between logical and transport channels, and radio resource allocations to the UE 1250 based on various priority metrics. The controller/processor 1275 is also responsible for HARQ operations, retransmission of lost packets, and signaling to the UE 1250.

A transmit (TX) processor 1216 implements various signal processing functions for the L1 layer (i.e., physical layer). The signal processing functions include coding and interleaving to facilitate forward error correction (FEC) at the UE 1250 and mapping to signal constellations based on various modulation schemes (e.g., binary phase-shift keying (BPS K), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1274 may be used to determine the coding and modulation scheme, as well as for spatial processing. The channel estimate may be derived from a reference signal and/or channel condition feedback transmitted by the UE 1250. Each spatial stream may then be provided to a different antenna 1220 via a separate transmitter 1218TX. Each transmitter 1218TX may modulate an RF carrier with a respective spatial stream for transmission.

At the UE 1250, each receiver 1254RX receives a signal through its respective antenna 1252. Each receiver 1254RX recovers information modulated onto an RF carrier and provides the information to the receive (RX) processor 1256. The RX processor 1256 implements various signal processing functions of the L1 layer. The RX processor 1256 may perform spatial processing on the information to recover any spatial streams destined for the UE 1250. If multiple spatial streams are destined for the UE 1250, they may be combined by the RX processor 1256 into a single OFDM symbol stream. The RX processor 1256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 1210. These soft decisions may be based on channel estimates computed by a channel estimator 1258. The soft decisions are then decoded and deinterleaved to recover the data and control signals that were originally transmitted by the eNB 1210 on the physical channel. The data and control signals are then provided to the controller/processor 1259.

The controller/processor 1259 may implement the L2 layer. The controller/processor 1259 can be associated with a memory 1260 that stores program code and data. The memory 1260 may be an example of a computer-readable medium. In the UL, the controller/processor 1259 provides demultiplexing between transport and logical channels, packet reassembly, deciphering, header decompression, control signal processing to recover upper layer packets from the core network. The upper layer packets are then provided to a data sink 1262, which represents all the protocol layers above the L2 layer. Various control signals may also be provided to the data sink 1262 for L3 processing. The controller/processor 1259 is also responsible for error detection using an acknowledgement (ACK) and/or negative acknowledgement (NACK) protocol to support HARQ operations.

In the UL, a data source 1267 is used to provide upper layer packets to the controller/processor 1259. The data source 1267 represents all protocol layers above the L2 layer. Similar to the functionality described in connection with the DL transmission by the eNB 1210, the controller/processor 1259 implements the L2 layer for the user plane and the control plane by providing header compression, ciphering, packet segmentation and reordering, and multiplexing between logical and transport channels based on radio resource allocations by the eNB 1210. The controller/processor 1259 is also responsible for HARQ operations, retransmission of lost packets, and signaling to the eNB 1210.

Channel estimates derived by the channel estimator 1258 from a reference signal or feedback transmitted by the eNB 1210 may be used by the TX processor 1268 to select the appropriate coding and modulation schemes, and to facilitate spatial processing. The spatial streams generated by the TX processor 1268 may be provided to different antenna 1252 via separate transmitters 1254TX. Each transmitter 1254TX may modulate an RF carrier with a respective spatial stream for transmission.

The UL transmission is processed at the eNB 1210 in a manner similar to that described in connection with the receiver function at the UE 1250. Each receiver 1218RX receives a signal through its respective antenna 1220. Each receiver 1218RX recovers information modulated onto an RF carrier and provides the information to a RX processor 1270. The RX processor 1270 may implement the L1 layer.

The controller/processor 1275 may implement the L2 layer. The controller/processor 1275 can be associated with a memory 1276 that stores program codes and data. The memory 1276 may be referred to as a computer-readable medium. In the UL, the controller/processor 1275 provides demultiplexing between transport and logical channels, packet reassembly, deciphering, header decompression, control signal processing to recover upper layer packets from the UE 1250. Upper layer packets from the controller/processor 1275 may be provided to the core network. The controller/processor 1275 is also responsible for error detection using an ACK and/or NACK protocol to support HARQ operations.

Figure 13:
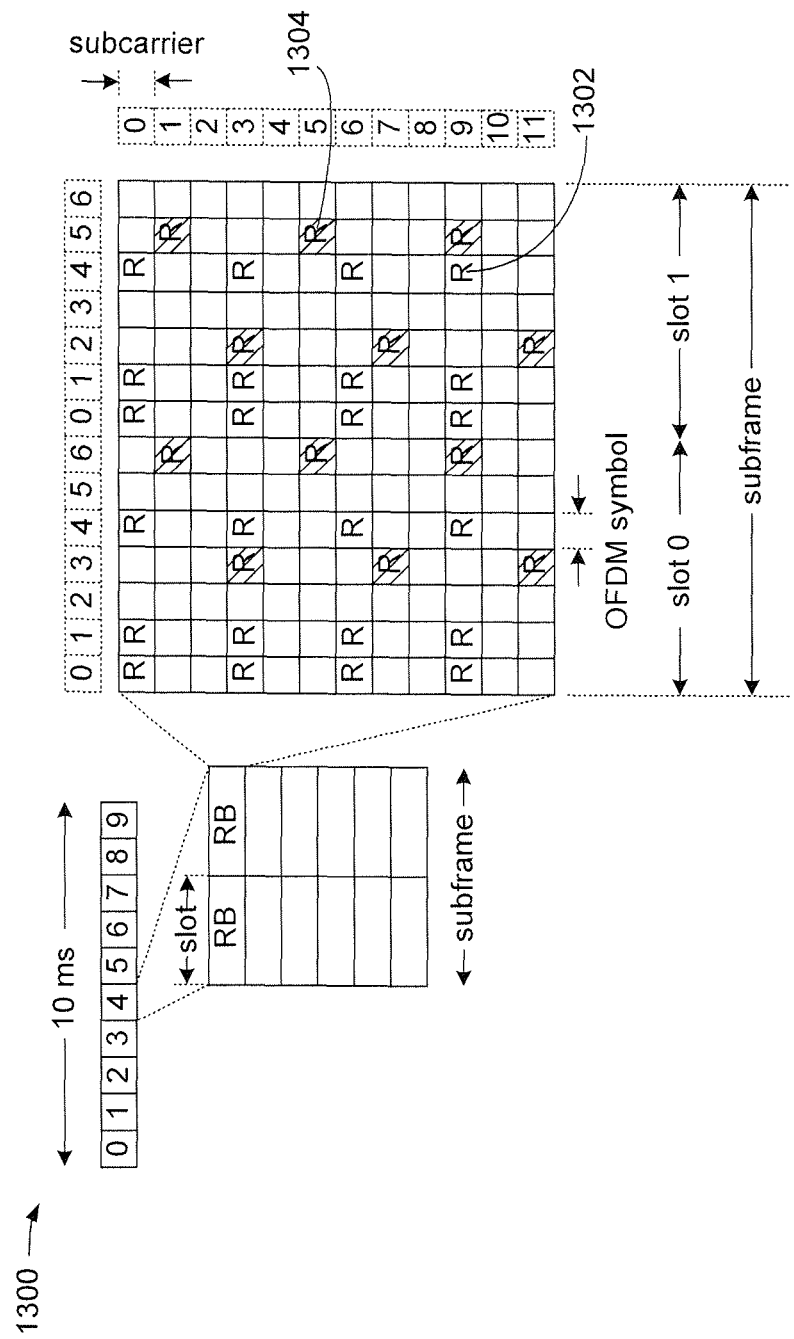
FIG. 13 is a diagram illustrating an example of a downlink frame structure in LTE, in accordance with various aspects of the present disclosure.

FIG. 13 is a diagram 1300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements, are possible. Some of the resource elements, indicated as R 1302, 1304, include DL reference signals (DL-RS). The DL-RS include Cell-specific RS (CRS) (also sometimes called common RS) 1302 and UE-specific RS (UE-RS) 1304. UE-RS 1304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 14:
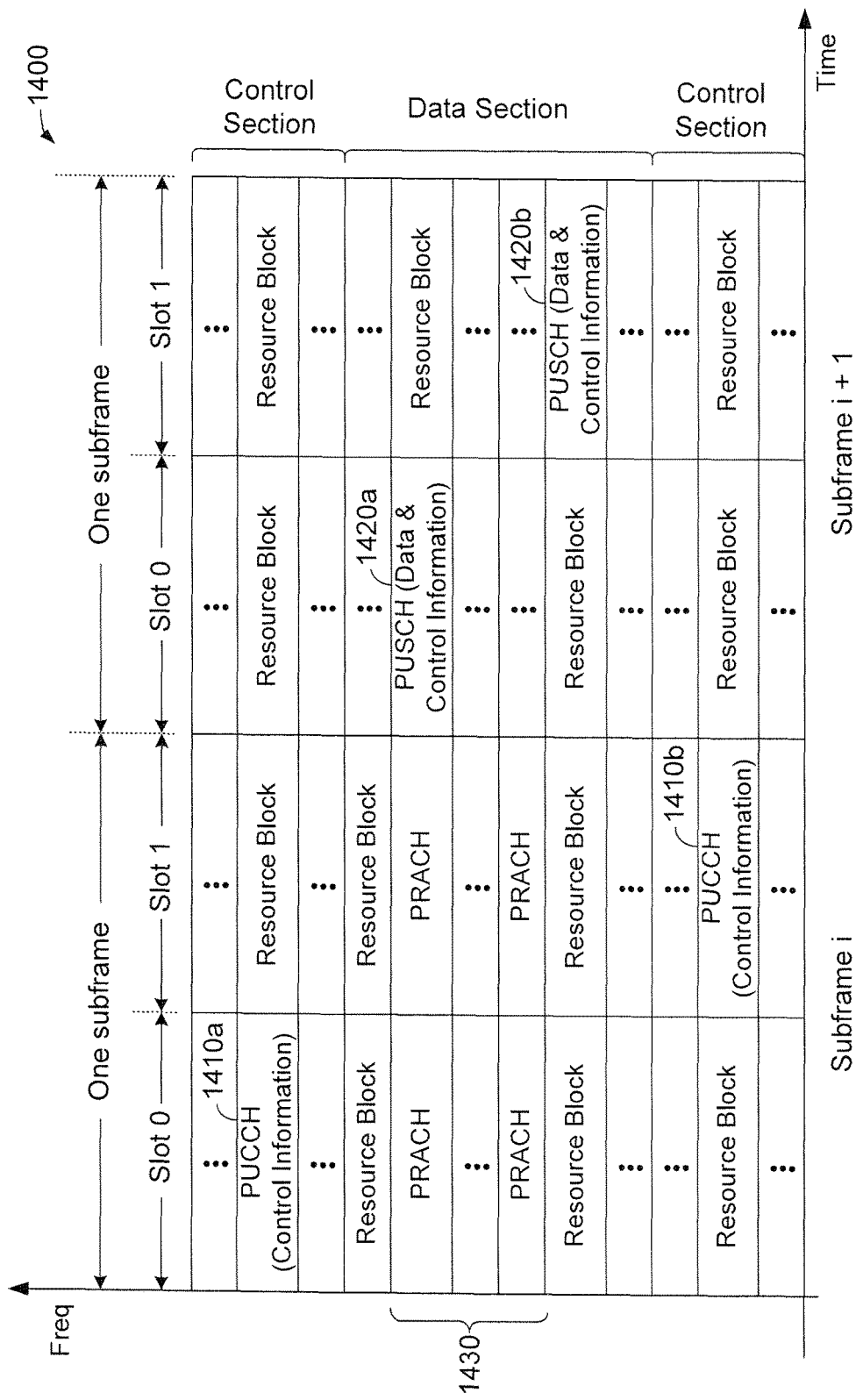
FIG. 14 is a diagram illustrating an example of an uplink frame structure in LTE, in accordance with various aspects of the present disclosure.

FIG. 14 is a diagram 1400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1410a, 1410b in the control section to transmit control information to an eNB. The UE may also be assigned resource blocks 1420a, 1420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 1430. The PRACH 1430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes, and a UE can make a single PRACH attempt per frame (10 ms).

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the subject matter of the disclosure. Various modifications to the disclosure will readily be apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for refining radio frequency (RF) communication link quality in a communication system, comprising:
   obtaining measured beam pair quality data between one or more transmit beams and one or more receive beams during a measurement time interval using an antenna array having a plurality of antennas, each antenna having a weight, a combination of weights of corresponding antennas defining an antenna array configuration; and
   adjusting the combination of weights to define a next antenna array configuration based on an output of a function responsive to the measured beam pair quality data and a combination of previous weights defining a previous antenna array configuration during a communication time interval following the measurement time interval.

2. The method of claim 1, wherein obtaining measured beam pair quality data comprises measuring a beam pair quality metric at a user equipment (UE).

3. The method of claim 2, wherein obtaining measured beam pair quality data comprises measuring signal-to-noise ratio (SNR) of a plurality of combinations of transmit beams and receive beams.

4. The method of claim 3, wherein adjusting the combination of weights to define the next antenna array configuration comprises adjusting the combination of weights in response to SNR data, UE velocity data, and the previous antenna array configuration.

5. The method of claim 3, further comprising transmitting the measured beam pair quality data from the UE to a base station.

6. The method of claim 2, wherein the UE includes an orthogonal frequency division multiplexing (OFDM) receiver, and obtaining measured beam pair quality data comprises configuring the UE to receive a plurality of receive (Rx) beams during each of a corresponding plurality of OFDM symbol periods.

7. The method of claim 6, wherein configuring the UE to receive the plurality of beam pairs is repeated during each OFDM symbol period of a synchronization sub-frame.

8. The method of claim 7, wherein configuring the UE to receive the plurality of beam pairs comprises changing a Rx beam direction to a different one of a plurality of Rx beam directions.

9. An apparatus for refining radio frequency (RF) communication link quality, comprising:
   an antenna array having a plurality of antennas, each antenna having a weight, a combination of weights of corresponding antennas defining an antenna array configuration; RF transceiver circuitry; and
   a processing system comprising a processor and memory, the processing system configured to:
   obtain measured beam pair quality data between one or more transmit beams and one or more receive beams during a measurement time interval using the antenna array; and
   adjust the combination of weights to define a next antenna array configuration based on an output of a function responsive to the measured beam pair quality data and a combination of previous weights defining a previous antenna array configuration during a communication time interval following the measurement time interval.

10. The apparatus of claim 9, wherein the apparatus comprises a user equipment (UE).

11. The apparatus of claim 10, wherein the processing system is configured to obtain measured beam pair quality data by being configured to measure signal-to-noise ratio (SNR) of a plurality of combinations of transmit beams and receive beams.

12. The apparatus of claim 11, wherein the processing system is configured to adjust the combination of weights to define the next antenna array configuration by being configured to adjust the combination of weights in response to SNR data, UE velocity data, and the previous antenna array configuration.

13. The apparatus of claim 11, wherein the processing system is further configured to transmit the measured beam pair quality data from the UE to a base station.

14. The apparatus of claim 10, wherein:
   the RF transceiver circuitry includes an orthogonal frequency division multiplexing (OFDM) receiver; and
   the processing system is configured to obtain measured beam pair quality data by configuring the antenna array to receive a plurality of receive (Rx) beams during each of a corresponding plurality of OFDM symbol periods.

15. The apparatus of claim 14, wherein the antenna array is configured to receive the plurality of beam pairs during each OFDM symbol period of a synchronization sub-frame.

16. The apparatus of claim 15, wherein the antenna array is configured to receive the plurality of beam pairs by changing a Rx beam direction to a different one of a plurality of Rx beam directions.

17. A non-transitory computer-readable medium storing computer executable code for refining radio frequency (RF) communication link quality in a communication system, the code executable by a processor to control a method comprising:
   obtaining measured beam pair quality data between one or more transmit beams and one or more receive beams during a measurement time interval using an antenna array having a plurality of antennas, each antenna having a weight, a combination of weights of corresponding antennas defining an antenna array configuration; and
   adjusting the combination of weights to define a next antenna array configuration based on an output of a function responsive to the measured beam pair quality data and a combination of previous weights defining a previous antenna array configuration during a communication time interval following the measurement time interval.

18. The non-transitory computer-readable medium of claim 17, wherein obtaining measured beam pair quality data comprises measuring a beam pair quality metric at a user equipment (UE).

19. The non-transitory computer-readable medium of claim 18, wherein obtaining measured beam pair quality data comprises measuring signal-to-noise ratio (SNR) of a plurality of combinations of transmit beams and receive beams.

20. The non-transitory computer-readable medium of claim 19, wherein adjusting the combination of weights to define the next antenna array configuration comprises adjusting the combination of weights in response to SNR data, UE velocity data, and the previous antenna array configuration.

21. The non-transitory computer-readable medium of claim 19, wherein the method further comprises transmitting the measured beam pair quality data from the UE to a base station.

22. The non-transitory computer-readable medium of claim 18, wherein the UE includes an orthogonal frequency division multiplexing (OFDM) receiver, and obtaining measured beam pair quality data comprises configuring the UE to receive a plurality of receive (Rx) beams during each of a corresponding plurality of OFDM symbol periods.

23. The non-transitory computer-readable medium of claim 22, wherein configuring the UE to receive the plurality of beam pairs is repeated during each OFDM symbol period of a synchronization sub-frame.

24. The non-transitory computer-readable medium of claim 23, wherein configuring the UE to receive the plurality of beam pairs comprises changing a Rx beam direction to a different one of a plurality of Rx beam directions.

25. A device for refining radio frequency (RF) communication link quality in a communication system, comprising:
   means for obtaining measured beam pair quality data between one or more transmit beams and one or more receive beams during a measurement time interval using an antenna array having a plurality of antennas, each antenna having a weight, a combination of weights of corresponding antennas defining an antenna array configuration; and
   means for adjusting the combination of weights to define a next antenna array configuration in response to the measured beam pair quality data and a previous antenna array configuration during a communication time interval following the measurement time interval.

26. The device of claim 25, wherein the means for obtaining measured beam pair quality data comprises means for measuring a beam pair quality metric at a user equipment (UE).

27. The device of claim 26, wherein the means for obtaining measured beam pair quality data comprises means for measuring signal-to-noise ratio (SNR) of a plurality of combinations of transmit beams and receive beams.

28. The device of claim 27, wherein the means for adjusting the combination of weights to define the next antenna array configuration comprises means for adjusting the combination of weights in response to SNR data, UE velocity data, and the previous antenna array configuration.

29. The device of claim 27, further comprising means for transmitting the measured beam pair quality data from the UE to a base station.

30. The device of claim 26, wherein the UE includes an orthogonal frequency division multiplexing (OFDM) receiver, and obtaining measured beam pair quality data comprises configuring the UE to receive a plurality of receive (Rx) beams during each of a corresponding plurality of OFDM symbol periods.

\* \* \* \* \*